Patented Apr. 25, 1933

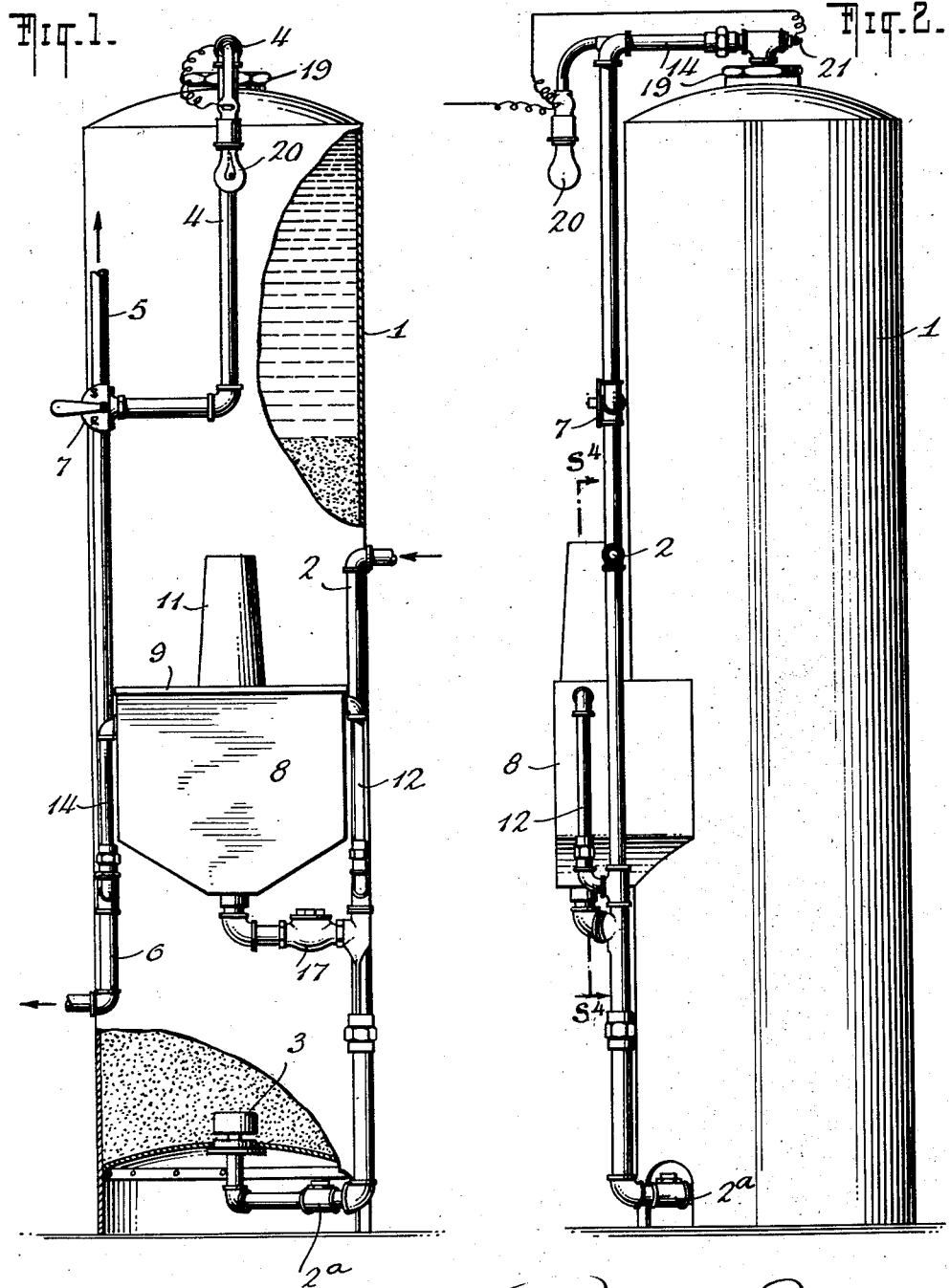

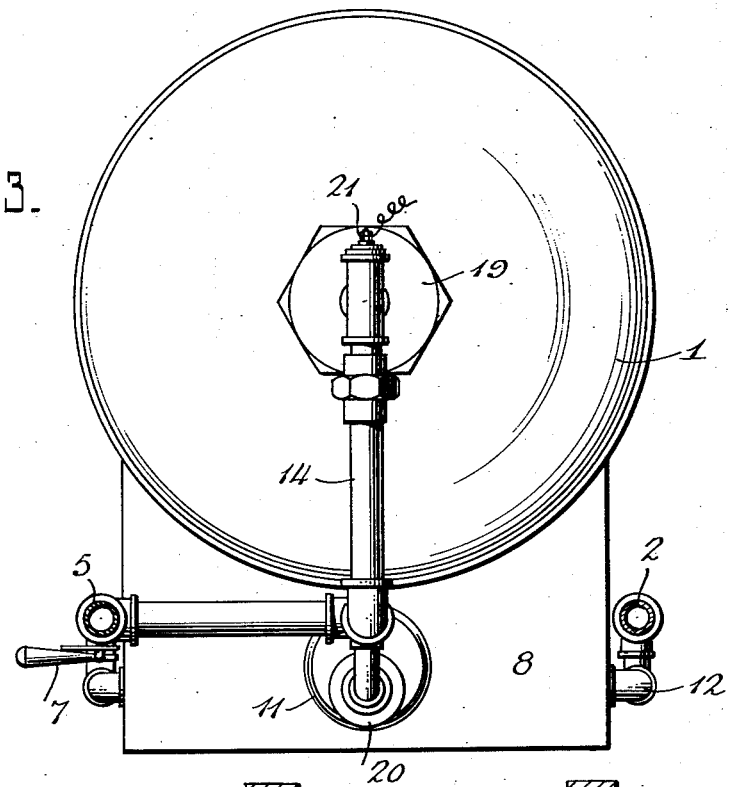
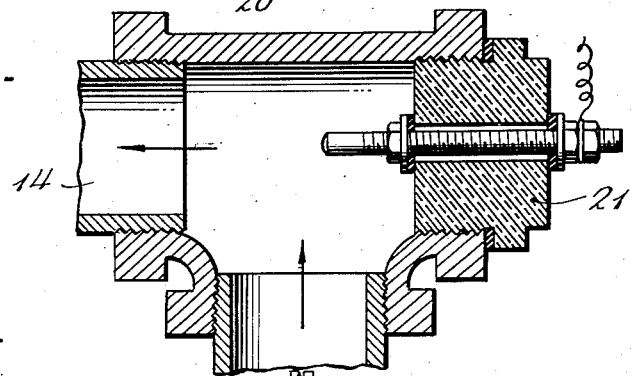
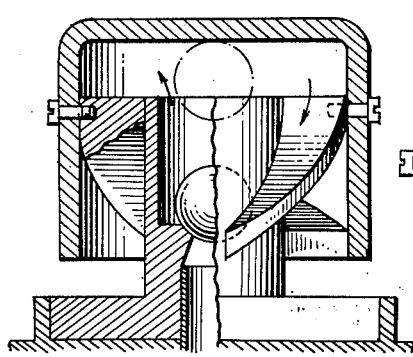
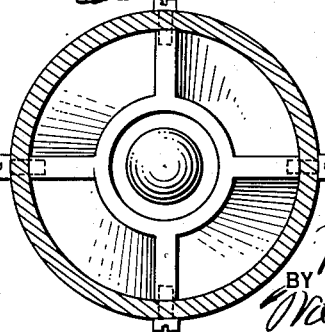

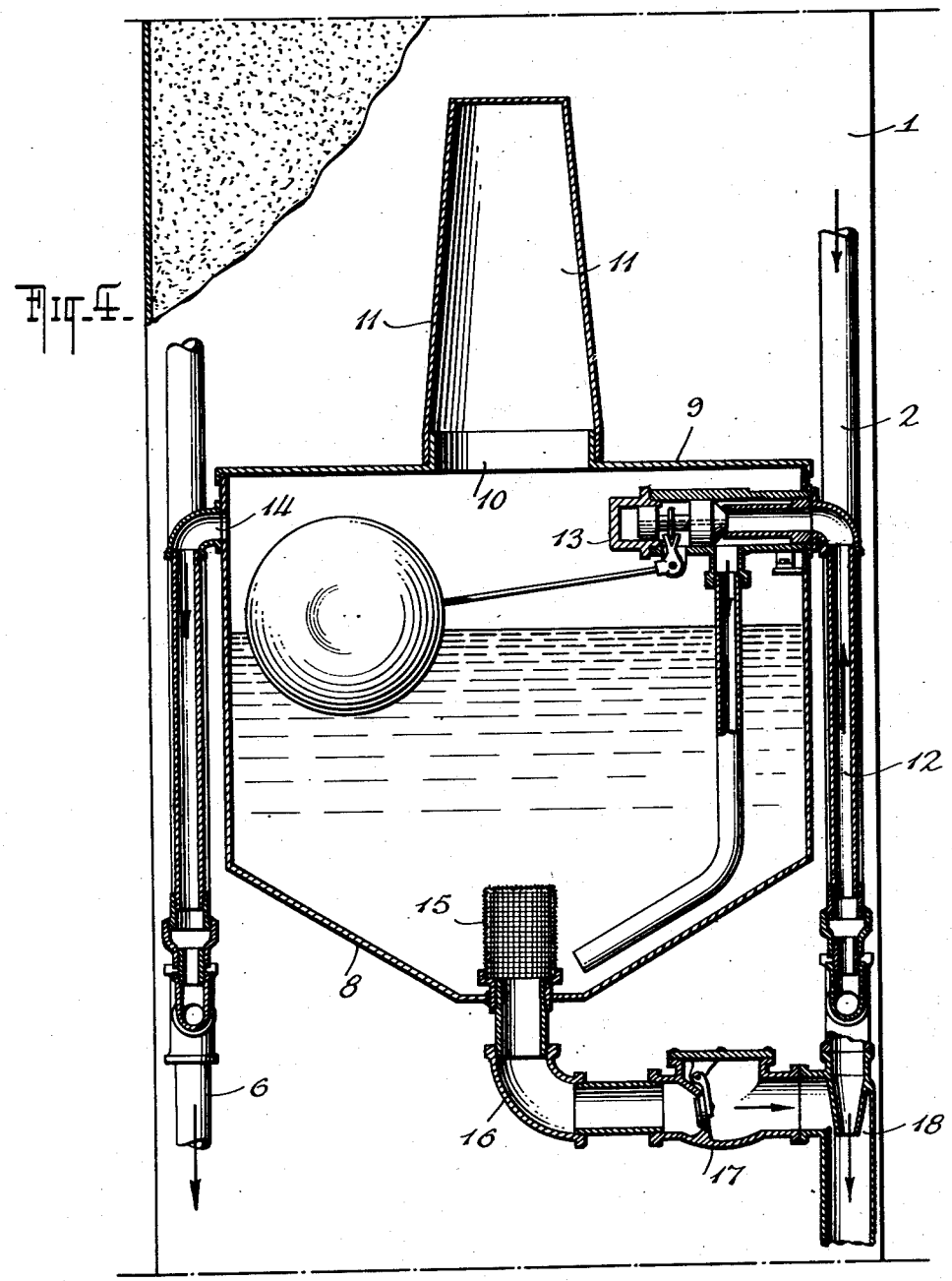

1,905,021

UNITED STATES PATENT OFFICE

RICHARD E. WAGNER, OF ROCKAWAY PARK, NEW YORK

WATER SOFTENING APPARATUS

Application filed June 13, 1930. Serial No. 460,926.

My invention relates to water softening apparatus and while not limited in its application, is specially adapted, as herein embodied, for use in connection with the "up-flow" type of such apparatus.

As is well known, the zeolite method commonly employed in softening water involves an exchange process by which the calcium and magnesium of the water are taken up by the zeolite and the sodium of the zeolite is given off to the water. As the accumulation of calcium and magnesium taken up by the zeolite acts to impair its effectiveness, it is necessary from time to time to recondition or regenerate the zeolite and this is accomplished by reversing the above process, which consists in subjecting the zeolite to the action of common salt solution, and results in again producing a sodium zeolite, effective for continued use.

Prominent among the objections to present day water softening apparatus, may be mentioned unnecessary complication, resulting high cost and excessive space occupied, which tends to restrict, limit and otherwise discourage extended use of such apparatus.

A further serious objection is found in the method and means provided in present day apparatus for introducing the salt or salt solution necessary for regenerating the zeolite and subsequently ejecting the solution to permit the softening process to be continued.

Having the above mentioned and other objections in mind, the present invention is designed to produce an extremely simple and comparatively inexpensive apparatus, occupying minimum floor space and provided with effective means for greatly facilitating thorough and complete regeneration of the zeolite.

The accompanying drawings will serve to illustrate apparatus suitable for carrying my invention into effect but I do not wish to be understood as intending to limit myself to either the exact form or details shown, as various changes may be made therein, without departing from the spirit and scope of the invention, as set forth in the appended claims.

In the drawings:

Fig. 1 is a view in front elevation, with parts broken away, of a water softening apparatus constructed in accordance with my invention;

Fig. 2 is a side elevation thereof;

Fig. 3 is a top plan view of the same.

Fig. 4 is a vertical section on the line $s^4$, $s^4$, of Fig. 2;

Fig. 5 is a detail sectional view of the open switch employed in connection with the signal light of the apparatus; and Figs. 6 and 7 are detail sectional views of the spray or jet nozzle employed in the main tank.

Referring now to the drawings, 1 represents a zeolite tank, or container, here shown of the vertical type and having dimensions suitable for providing any capacity required.

A hard water supply pipe 2, leads through a check valve $2^a$, to the bottom of the tank and may terminate in any form of distributing system desired. As shown, a head or nozzle 3 is provided, suitable for discharging the water in sprays or jets in a manner to impart rotary motion to the body of liquid and contained zeolite in the tank.

Outlet is from the top of the tank, by way of a pipe 4, through which soft water is delivered to a service pipe 5.

A drain pipe is provided at 6, and connecting and controlling the soft water outlet pipe 4, the service pipe 5, and the drain pipe 6, there is a three-way valve 7, movable to one position to cut off the drain pipe and open the soft water supply to the service pipe and to another position, to cut off the service pipe and open the soft water pipe to the drain.

When the water softening process is in operation, the position of the valve is that first above described and when the tank is being salted to regenerate the contained zeolite, the position of the valve is usually shifted to the position last above described.

Attached to or otherwise suitably supported exteriorly of the main tank 1, there is a small auxiliary tank 8, designed as a container for the dry salt or salt solution employed in regenerating the zeolite in the main tank. The auxiliary tank 8, is, in effect, an open top tank, and would serve every purpose, here required, if so constructed, but to avoid splashing of the liquid over the sides and to give the apparatus a more finished appearance, the tank is provided with a cover 9, having a large centered and upwardly flanged opening 10, through which salt is entered in the tank.

Loosely covering, but not tightly closing the opening 10, there is an inverted salt measure 11, provided for convenience of the attendant in determining the quantity required for each salting operation.

The auxiliary tank 8 is provided with a hard water inlet through a branch connection 12, from the main supply pipe 2. This inlet pipe may be continued downward within the tank to any suitable depth and preferably terminates near the center at the bottom thereof, being provided with a float valve 13, by means of which any desired water level may be maintained in the tank.

An overflow 14 leads from the tank 8 to the drain pipe 6.

The bottom of the auxiliary tank 8 is, in effect, coned and from an outlet 15, therein, screened or open, as desired, a connection 16 leads through a check valve 17 to an ejector 18, which is connected in the main hard water supply pipe 2, at a point below the branch inlet connection 12 therefrom to the auxiliary tank 8.

It will thus be seen that the arrangement of the inlet and outlet connections to the auxiliary tank are such as to form a by-pass through the tank and around the ejector in the main supply pipe, fully compensating for the restriction therein formed by the ejector nozzle and avoiding any resulting reduction in the pressure or volume of the inflow of hard water to the main tank.

In operation, the main tank is filled to within a foot or two of the top with zeolite. This can be entered through the large screw plug 19 in the top of the tank and as the zeolite lasts indefinitely, under regeneration from time to time, as required, there will be no occasion, under normal conditions, for again removing the screw plug, etc., once the tank is charged with zeolite.

In order that hard water may enter the main tank, an outlet must be provided through the valve 7, to the drain or, if that is closed, through an opened faucet in the service pipe. Hard water will then enter both tanks, the flow being direct from the supply, through the ejector 18, to the main tank and through the connection 12 to the auxiliary tank. Arranged as shown, the ejector acts to draw water from the auxiliary tank, which unites with the discharge from the ejector, to increase the flow and to maintain the necessary supply to the main tank.

As the water rises in the main tank, the zeolite is carried upward in floating suspension and due to the action of the inlet spray or jet nozzle, the water in the tank will be given a gradually increasing rotary motion, causing the zeolite particles to separate and become completely distributed throughout the moving body of water, with the result that the water softening process, above described, is so greatly expedited, as to permit a high rate of flow through the tank, thereby materially increasing the soft water supply for any given period of time.

In the normal operation of the apparatus, the valve 7, is turned to the position to cut off the drain and open the soft water outlet from the top of the main tank to the service pipe. With the valve 7, thus positioned, there will be flow through the apparatus only when a faucet in the service pipe is opened to draw off soft water and on closing the faucet, the flow through the apparatus will cease.

As previously explained, it is necessary from time to time, to recondition or regenerate the zeolite in the main tank. This is done by emptying a suitable quantity of common salt into the auxiliary tank and the regenerating operation is thereafter automatic. The location of the hard water inlet near the bottom of the tank prevents the salt from settling down and choking or clogging the screened outlet thereof and also keeps the body of water in the tank sufficiently agitated to cause the salt to dissolve rapidly, forming a brine or salt solution, which is drawn from the auxiliary tank by the action of the ejector 18, and is carried by the hard water supply into the main tank, entering at the bottom thereof, as above described.

The extension of the hard water inlet to the bottom of the auxiliary tank and the screening of the adjacent outlet, may be omitted, if desired, as I have found that both coarse salt and rock salt will pass the ejector and enter the main tank, thus making it unnecessary to effect complete dissolution in the auxiliary tank.

The valve 7 provides a convenient means of directing the discharge from the main tank to the drain, during the salting operation but its use is optional, as the opening of a faucet in the service pipe, leading to any other drain, will serve the same purpose.

To determine the completion of the regenerating process, I provide an automatic indicator in the form of an electric signal lamp 20. The lamp circuit is normally open, the separated terminals, one insulated and the other grounded, lie within the soft water outlet pipe at the top of the main tank. To provide such separated terminals, I employ as one terminal an insulated electrode 21, which is adjustably secured in a T-connection of the outlet pipe and as the other terminal, the grounded outlet pipe of the tank. As shown, the insulated electrode 21, is connected to the live side of an electric service line. When the softening process is in operation, fresh water passing through the outlet from the main tank and bridging the lamp circuit terminals will not have sufficient conductivity to close the circuit and light the lamp, but as the brine or salt solution used in regenerating the zeolite, enters the outlet pipe, its conductivity being greater, will close the lamp circuit through the terminals and cause the lamp to glow, as a sign or signal to the attendant that the salt solution is passing out of the tank.

Once lighted, the lamp continues to glow until the salt solution passes out of the tank and fresh water begins to flow and thereupon, as above explained, the lamp circuit is broken. The cutting out of the lamp, indicates to the attendant that the softening process is again in effective operation and that a supply of soft water is available.

The many important advantages of the invention will be apparent from the foregoing and it will not, therefore, be necessary to further describe them.

Having thus described my invention, what I claim is:

1. An apparatus for the treatment of water comprising a main tank provided with requisite water inlet and outlet connections, an auxiliary tank supplied from the main tank water inlet connection, and an ejector utilizing the inlet flow to the main tank for effecting continuous delivery during such flow from the auxiliary tank to the main tank.

2. A water softening apparatus comprising a main tank containing zeolite in suitable quantity and provided with requisite water inlet and outlet connections, an auxiliary tank, means utilizing the flow of water in the main tank inlet connection for effecting continuous delivery during such flow from the auxiliary tank to the main tank, and a by-pass for said means in the main tank inlet connection providing inlet and outlet connections for the auxiliary tank.

3. A water softening apparatus comprising a main tank containing zeolite in suitable quantity and provided with requisite water inlet and outlet connections, an auxiliary tank, an ejector utilizing the inlet flow to the main tank for effecting continuous delivery from the auxiliary tank to the main tank during such flow and a by-pass for the ejector in the main tank inlet connection providing inlet and outlet connections for the auxiliary tank.

4. A water softening apparatus comprising a main tank containing zeolite in suitable quantity and provided with requisite water inlet and outlet connections, an auxiliary tank, an ejector in the inlet connection utilizing the flow of the water therein to effect continuous delivery from the auxiliary tank during such flow and a by-pass in the main tank inlet connection opening through the auxiliary tank and extending around the ejector.

5. A water softening apparatus comprising a main tank containing zeolite in suitable quantity and provided with requisite water inlet and outlet connections, an auxiliary tank, an ejector in the inlet connection utilizing the flow of the water therein to effect continuous delivery from the auxiliary tank during such flow, and a valved by-pass in the main tank inlet connection opening through the auxiliary tank and extending around the ejector.

6. A water softening apparatus comprising a main tank containing zeolite in suitable quantity and provided with bottom inlet and top outlet connections, an open auxiliary tank provided with means for automatically maintaining a predetermined liquid level therein, an ejector in the inlet connection utilizing the flow of water therein to effect continuous delivery from the auxiliary tank during such flow, and an inlet connection by-pass opening through the auxiliary tank and extending around the ejector.

I affix my signature.

RICHARD E. WAGNER.